(12) United States Patent
Mercier et al.

(10) Patent No.: US 11,891,951 B1
(45) Date of Patent: Feb. 6, 2024

(54) SCRAMJET ISOLATOR

(71) Applicant: Government of the United States, as represented by the Secretary of the Air Force, Wright-Patterson AFB, OH (US)

(72) Inventors: Robert Mercier, Huber Heights, OH (US); Mark Gruber, Fairborn, OH (US); Ryan Milligan, Waynesville, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/104,327

(22) Filed: Feb. 1, 2023

Related U.S. Application Data

(63) Continuation-in-part of application No. 17/736,120, filed on May 4, 2022, now Pat. No. 11,619,193.

(60) Provisional application No. 63/195,349, filed on Jun. 1, 2021.

(51) Int. Cl.
*F02K 7/14* (2006.01)
*F02C 7/04* (2006.01)

(52) U.S. Cl.
CPC .................. *F02C 7/04* (2013.01); *F02K 7/14* (2013.01); *F05D 2250/14* (2013.01)

(58) Field of Classification Search
CPC .... F02K 7/04; F02K 7/14–20; F05D 2240/35; F05D 2250/14; F05D 2260/60
See application file for complete search history.

(56) References Cited

U.S. PATENT DOCUMENTS 10,590,848 B2    3/2020   Cicchini
2021/0239321 A1*  8/2021  Segal .................... F23R 3/20

OTHER PUBLICATIONS

Michael K. Smart, Scramjet Isolators, Centre for Hypersonics The University of Queensland Brisbane 4072 Australia, Sep. 1, 2010, RTO-EN-AVT-185.

\* cited by examiner

*Primary Examiner* — Steven M Sutherland
(74) *Attorney, Agent, or Firm* — AFMCLO/JAZ; Matthew D. Fair

(57) ABSTRACT

A scramjet engine with a novel isolator is disclosed herein. The scramjet includes an air inlet configured to receive and direct air into the engine and a combustor operable to receive air from the air inlet and combust fuel therein as is conventional. An isolator is positioned between the air inlet and the combustor. The isolator includes a primary flow path separated into a plurality of separate secondary flow channels formed therethrough. The smaller secondary flow channels prevent shockwaves from propagating upstream from the combustor to the inlet that can occur during some operating conditions of a supersonic combustion flow process.

15 Claims, 4 Drawing Sheets

SCRAMJET ISOLATOR

Pursuant to 37 C.F.R. § 1.78(a)(4), this application is a Continuation in Part of Non-provisional application Ser. No. 17/736,120 filed May 4, 2022 which in turn claims the benefit of and priority to prior filed Provisional Application Ser. No. 63/195,349, filed Jun. 1, 2021, now expired, both of which are expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to an isolator for a scramjet engine and more particularly, but not exclusively to an isolator designed to minimize the size of the scramjet engine.

BACKGROUND

Scramjet propulsion systems do not have turbomachinery components that are used in turbojet systems. By removing the compressor, the turbine and supporting components, air is free to pass through the engine substantially unimpeded. This translates into higher mass flow, higher speeds, and higher thrust output. This thrust can be increased to propel the aircraft to fly at both high supersonic and hypersonic speeds. In the lower speed regime, between Mach 4 and 8, the combustion is characterized by a dual-mode combustion. In dual-mode combustion operation, the pressure rise generated by heat-release in the combustor can propagate upstream of fuel injection in the form of a shockwaves. These shockwaves are better known as a pre-combustion shock train. This shock train can detrimentally affect the operation of the air inlet by causing the inlet to unstart. Unstart is an event where the shock train travels into and out of the inlet causing engine mass capture loss which can lead to decreased engine performance or even engine blowout. One method to mitigate this problem is to install an isolator duct between the inlet and the combustor. The isolator duct can reduce the chance that the shock train will trigger inlet unstart. The length of the isolator duct depends on the aircraft operating flight envelop.

FIG. 1 shows a schematic representation of a prior art scramjet powered vehicle. In this illustration, airflow is compressed by shockwaves in the inlet, and is then transported to the combustor at supersonic speeds. Combustion of fuel with the incoming air generates a large local pressure rise and separation of the boundary layer on the surfaces of the combustor duct. This aerodynamic separation can cause pressure perturbations that feed upstream of the point of fuel injection and acts to further compress the core flow thus the generation of the shock-train. As mentioned above, this shock train can cause problems by triggering inlet unstart.

An isolator positioned in the scramjet flow path upstream of the combustor can contain the shock train and stop it from disrupting the operation of the inlet. At relative low Mach (below Mach 8) scramjet operating conditions, the flow downstream of the shock train can be decelerated to subsonic speeds prior to it entering the combustion chamber. In this instance, the core flow must then be re-accelerated through Mach 1 by generating what is called a thermal throat. A thermal throat is produced via a balance between combustor heat release and combustor area increase. The combination of subsonic and supersonic flow through the combustion chamber is known as dual-mode combustion. Dual-mode combustion can produce large pressure levels in the combustor and nozzle, generating high levels of thrust. This flow is affected by many parameters, including the Mach number entering the isolator from the inlet, the state of the boundary layer in the isolator, the area distribution of the combustor, and the fuel injection strategy. At speeds above Mach 8, the increased kinetic energy of the airflow through the engine means that the combustion generated pressure rise is not strong enough to cause boundary layer separation thus keeping the shock train from propagating upstream. The core airflow remains supersonic throughout the engine thus operating in scramjet mode. In this instance, an isolator is no longer needed and the presence of it causes considerably higher viscous losses as supersonic flow passes through it thus decreasing overall engine thrust.

The structure of the shock train is of interest in the design of scramjet isolators. FIG. 2 is a schematic illustration of a prior art isolator where the shock train is imposed on the incoming supersonic airflow. If there were no boundary layer, a normal shock would form in a plane. However, the presence of an incoming boundary layer produces a series of normal and/or oblique shocks that spreads the pressure rise over a given length thus forming the shock train. In literature, the shock train can also be described as a "pseudo shock", which is characterized by a region of separated flow next to the wall, together with a supersonic core that experiences a pressure gradient due to the area restriction of the separation, forming a series of crossing oblique shocks in the core flow. A mixing region also grows between the core and separated flows, balancing the pressure rise in the core against the shear stress on the boundary of the separation. Finally, the flow reattaches at some point and mixes out to conditions that match the backpressure. Being able to predict the length scale of the shock train is the key component of isolator design for dual-mode scramjets. Some existing systems that use these prior art isolator ducts have various shortcomings. For example, the isolator becoming a viscous drag penalty at higher speeds (as mentioned above) and excessive weight penalty if the isolator is generally too long for a given flight envelop. Optimally minimizing isolator length for a given flight envelop is one way to improve upon an isolator's shortcoming or minimizing isolator length with a new novel isolator design would be another way to improve upon its shortcomings. Accordingly, there remains a need for further contributions in this area of technology.

SUMMARY

One embodiment of the present disclosure includes a unique isolator for a scramjet engine. Other embodiments include apparatuses, systems, devices, hardware, methods, and combinations include an isolator having a plurality of flow paths that operate to reduce the length of the isolator required to prevent aerodynamic interference with airflow passing upstream through an inlet. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
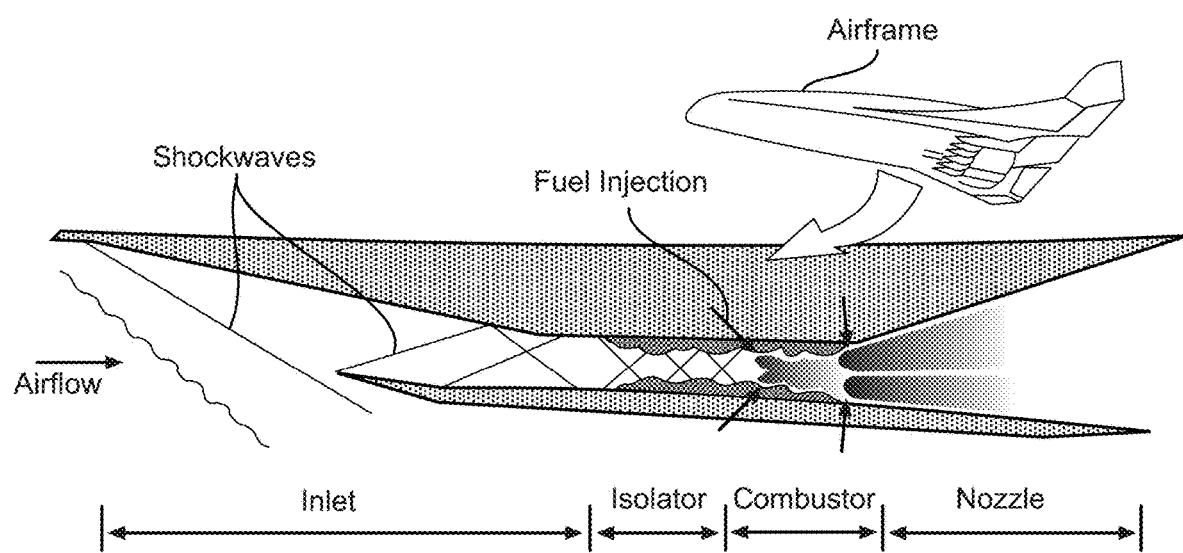
FIG. 1 is a view of a prior art aircraft powered by a scramjet engine according to a prior art embodiment.
Figure 2:
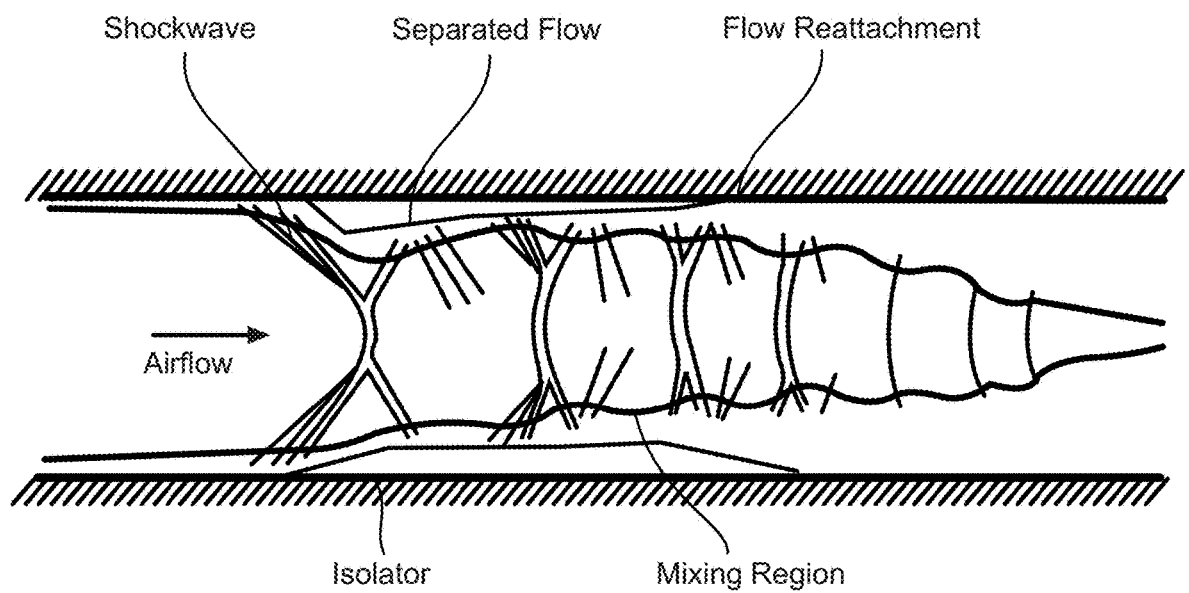
FIG. 2 is a cross sectional view of an isolator according to a prior art embodiment.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 3:
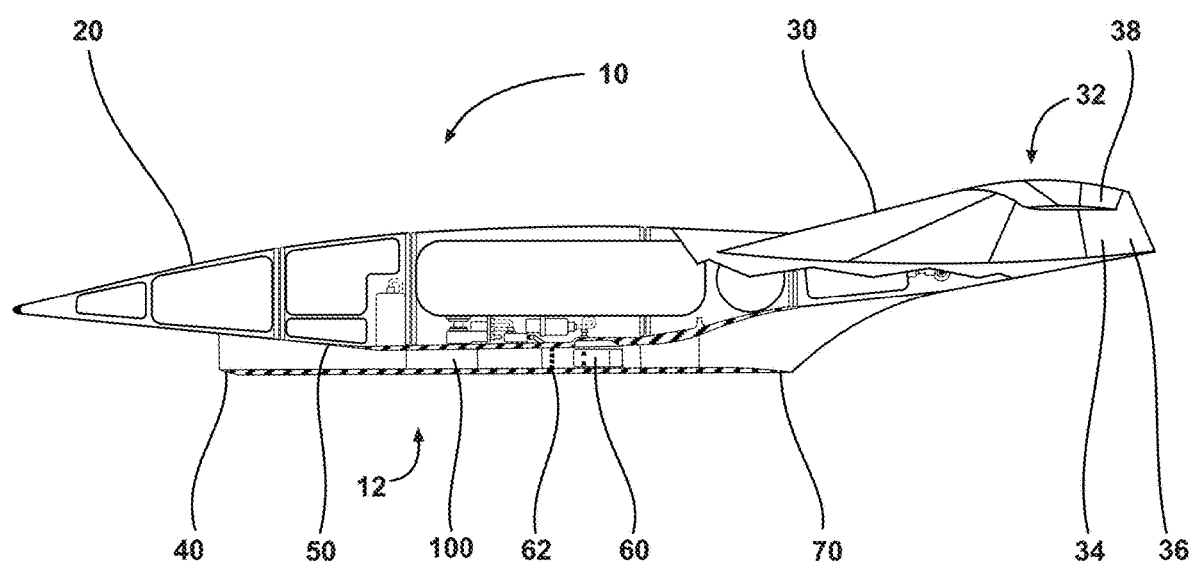
FIG. 3 is a cross sectional view of an aircraft powered by a scramjet engine according to one embodiment of the present disclosure.

Referring to FIG. 3, there are illustrated some aspects of a non-limiting example of a scramjet aircraft 10 that may be operable with a scramjet engine 12 illustrated in the exemplary embodiment. The scramjet aircraft 10 is operable at speeds of approximately Mach 3 and above. The illustrated scramjet engine 12 includes a substantially rectangular inlet and exhaust, however in other embodiments the scramjet engine 12 may have any cross sectional shape integrated with the aircraft 10, such as by way of example and not limitation, a circular cross section. The aircraft 10 includes a forward fuselage 20 and an empennage 30. In some forms, the empennage may include a traditional tail assembly 32 that includes a tail 34, vertical stabilizer 36 and an elevator 38. In other forms, the aircraft may not include a traditional tail assembly such as those of a flying wing or the like. The wings of the aircraft are not shown in this cross sectional view, but can be of any design operable in high Mach number flight as one skilled in the art would understand.

The scramjet engine 12 includes an air inlet 40 with a converging region 50 to compress the high Mach airflow to a high pressure without using a traditional axial compressor. A combustor 60 is positioned downstream of the inlet 40 where fuel injectors 62 inject a fuel to combust with the compressed air. The high pressure and high temperature exhaust products exiting the combustor 60 are expanded and accelerated through an exhaust nozzle 70 to provide the thrust required to propel the aircraft 10 at speeds of Mach 4 and greater. An isolator 100 can be positioned between the inlet 40 and the combustor 60 to provide increased operability of the scramjet system.

Figure 4:
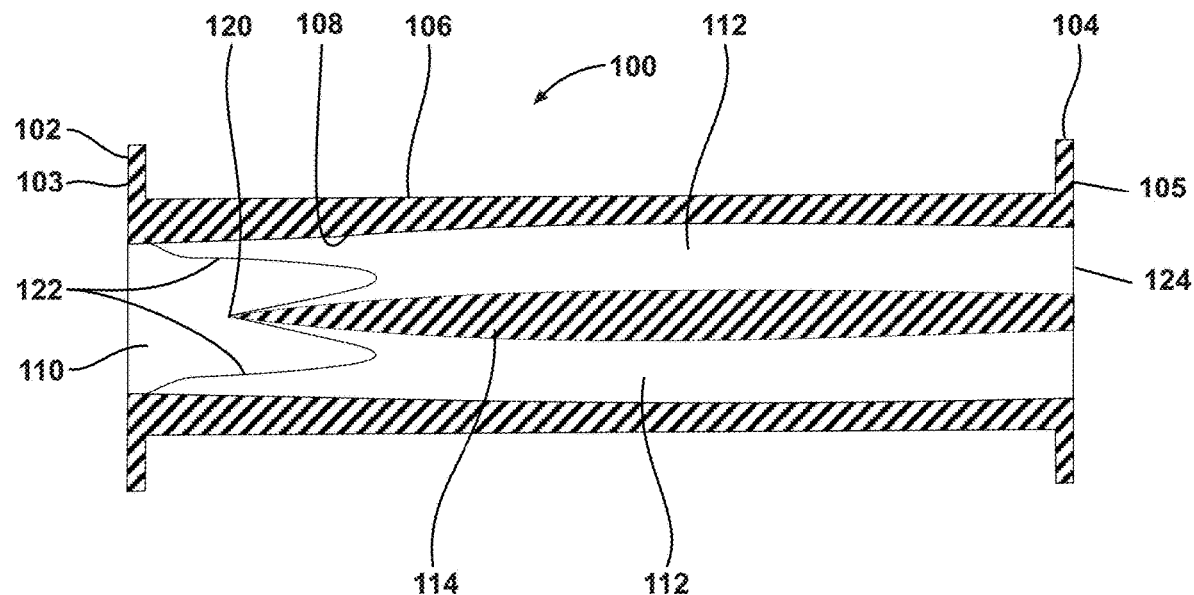
FIG. 4 is a side cross sectional view of an isolator according to one embodiment of the present disclosure.
Figure 5:
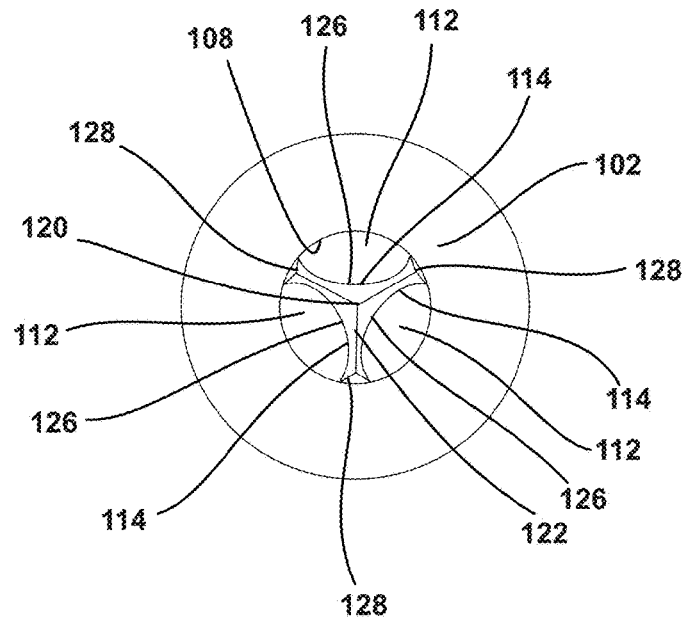
FIG. 5 is an end view of the isolator shown in FIG. 4.

Referring now to FIGS. 4 and 5, a cross sectional view of an isolator 100 and an end view of an isolator 100 according to one non-limiting embodiment are depicted. The isolator 100 extends between a first or forward end 102 and a second or aft end 104. A first flange 103 may project from the forward end 102 and a second flange 105 may project from the aft end 104 to connect with components of the engine 12 in the upstream and downstream directions. The flanges 103, 105 may include mechanical fasteners (not shown) or other attachment means such as weld or braze to connect engine components together.

The isolator 100 includes an outer perimeter wall 106 extending between the first and second ends 102, 104, respectively. The outer perimeter wall 106 includes an inner surface 108 to define the outer flow boundary for the airflow passageway. A plurality of separate secondary flow channels 112 are formed internal to the isolator 100. The number of secondary channels can vary depending on the engine size or flight envelop requirements of the aircraft, however in the depicted embodiment there are three separate secondary channels 112.

A plurality of longitudinal channel walls 114 extend along a length of the isolator 100 to separate and form one side of each of the secondary channels 112. The channel walls 114 and the outer perimeter wall 106 of the isolator 100 are solid and fluid impermeable to prevent air or other fluids from passing therethrough. The plurality of longitudinal channel walls 114 can be connected together to form a central pointed tip 120 extending toward the forward end 102 at a central location of the isolator housing 100. Each of the channel walls 114 extend between a leading edge 122 and a trailing edge 124 thereof. In some forms, the leading edge 122 can be defined by a knife edge that projects along an arcuate path between the inner surface 108 of the outer perimeter wall 106 and the central pointed tip 120. The knife-edge formed at the leading edge 122 of each longitudinal wall 114 and the central pointed tip 120 are configured to reduce shock losses of the hypersonic flow velocities of the air moving through the scramjet engine 12 at supersonic speeds. The trailing edge 124 of the secondary flow channels 112 terminates at the aft end 104 of the Isolator 100. The longitudinal channel walls 114 can be further defined by an arcuate sidewall 126 that extends between the inner surface 108 of the outer perimeter wall 106 of the isolator housing 100. The arcuate sidewalls 126 extend between opposing edge walls 128 formed on each of the channel walls 114. The edge walls 128 of the channel walls 114 can be connected to the inner surface 108 of the isolator housing 100. The arcuate sidewalls 126 and the inner surface 108 of the isolator housing 100 cooperate to form a substantially elliptical cross sectional flow area through the secondary flow channels 114. It should be understood that the disclosed embodiment depicts three secondary flow channels, however in other embodiments a different number of flow channels may be incorporated such as 2, 4 or more. The cross sectional shapes of the flow area con be modified by changing the shape of the inner surface 108 of the isolator housing 100 and the side-walls 126 of the channel walls 114.

In one aspect, the present disclosure includes a scramjet engine comprising: an air inlet configured to receive and direct air into the engine; a combustor operable to receive air from the air inlet and combust fuel therein; an isolator defined by a housing extending between first and second ends, the isolator positioned between the air inlet and the combustor; and wherein the isolator includes a primary flow path separated into a plurality of separate secondary flow channels formed therethrough.

In refining aspects, the scramjet engine further comprises a plurality of channel walls extending along at least a portion of a longitudinal length of the isolator to form the secondary flow channels; a central pointed tip extending from the plurality of channel walls toward the first end of the isolator; wherein the central pointed tip directs airflow from the inlet to the secondary flow channels; wherein each of the plurality of channel walls extend between a first edge wall and a second edge wall to define a sidewall thereof; wherein the first and second edge walls engage an inner perimeter wall of the isolator housing; wherein the sidewalls of the channel walls are curved in a lateral direction between first and second edge walls; wherein the curved channel walls and an inner perimeter wall of the isolator housing cooperate to form an elliptical cross sectional flow area through the secondary channel flow paths; wherein the central tip is terminates downstream of the first end of the isolator housing; and wherein the central tip is terminates upstream of the first end of the isolator housing.

Another aspect of the present disclosure includes an isolator for a scramjet comprising: a housing having a longitudinal length extending between a forward end and an aft end; wherein the forward end receives airflow from an air inlet; wherein the aft end discharges airflow to a combustor; and a plurality of separate flow channels formed internal to the housing configured to direct airflow therethrough.

In refining aspects, the isolator further comprises a plurality of internal channel walls configured to form the flow channels within the housing; a pointed tip extending from the internal walls toward the forward end of the housing; wherein the pointed tip projects past the forward end of the housing; wherein each of the internal channel walls include a sidewall with an arcuate shape in a lateral direction between an opposing pair of edge walls; wherein the edge walls of each channel wall engage with an internal wall of the housing; wherein the internal wall of the housing is arcuate in cross section; and wherein a cross sectional shape of the separate flow channels are substantially elliptical.

In another aspect, the present disclosure includes a method for operating a scramjet comprising: receiving airflow into an engine inlet at a speed of at least Mach 3; compressing the airflow through the inlet; splitting the airflow into a plurality of smaller flow paths in an isolator; discharging the airflow from the isolator into a combustor; injecting fuel into the combustor; combusting the fuel; and accelerating an exhaust byproduct through a nozzle at supersonic speeds. In refining aspects, the method further comprises minimizing and/or preventing upstream shock wave propagation through the isolator using the plurality of smaller flow paths formed therein.

In another aspect, a scramjet engine comprises: an air inlet configured to receive and direct air into the engine; a combustor operable to receive air from the air inlet and combust fuel therein; an isolator defined by a housing extending between first and second ends, the isolator positioned between the air inlet and the combustor; and wherein the isolator includes a primary flow path separated into a plurality of separate secondary flow channels formed therethrough; a plurality of channel walls extending along at least a portion of a longitudinal length of the isolator to form the secondary flow channels; a central pointed tip extending from the plurality of channel walls toward the first end of the isolator; wherein the central pointed tip directs airflow from the inlet to the secondary flow channels; and wherein the central pointed tip terminates upstream of the first end of the isolator housing.

In refining aspects, each of the plurality of channel walls extend between a first edge wall and a second edge wall to define a sidewall thereof; wherein the first and second edge walls engage an inner perimeter wall of the isolator housing; wherein the sidewalls of the channel walls are curved in a lateral direction between first and second edge walls; wherein the channel walls and an inner perimeter wall of the isolator housing cooperate to form an elliptical cross sectional flow area through the secondary channel flow paths; and wherein the central tip is terminates downstream of the first end of the isolator housing.

In another aspect, an isolator for a scramjet comprises: a housing having a longitudinal length extending between a forward end and an aft end; wherein the forward end receives airflow from an air inlet; wherein the aft end discharges airflow to a combustor; a plurality of separate flow channels formed internal to the housing configured to direct airflow therethrough; and wherein the flow channels are formed by solid walls that prevents fluid from passing therethrough.

In refining aspects, the isolator includes a plurality of internal channel walls configured to form the flow channels within the housing; a pointed tip extending from the internal channel walls toward the forward end of the housing; wherein the pointed tip projects past the forward end of the housing; wherein each of the internal channel walls include a sidewall with an arcuate shape in a lateral direction between an opposing pair of edge walls; wherein the edge walls of each channel wall engage with an internal wall of the housing; wherein the internal wall of the housing is arcuate in cross section; and wherein a cross sectional shape of the separate flow channels are substantially elliptical.

In another aspect, a method for operating a scramjet comprises: receiving airflow into an engine inlet at a speed of at least Mach 3; compressing the airflow through the inlet; splitting the airflow into a plurality of smaller flow paths in an isolator; wherein the smaller flow paths extend to an aft end of the isolator; discharging the airflow from the isolator into a combustor; injecting fuel into the combustor; combusting the fuel; and accelerating an exhaust byproduct through a nozzle at supersonic speeds.

In refining aspects, the method further comprises minimizing upstream shock wave propagation through the isolator using the plurality of smaller flow paths formed therein; and preventing upstream shock wave propagation through the isolator using the plurality of smaller flow paths formed therein.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A scramjet engine comprising:
   an air inlet configured to receive and direct air into the scramjet engine;
   a combustor operable to receive air from the air inlet and combust fuel therein;
   an isolator defined by a housing extending between first and second ends, the isolator positioned between the air inlet and the combustor; and wherein the isolator includes a primary flow path separated into a plurality of separate secondary flow channels formed therethrough;

a plurality of channel walls extending along at least a portion of a longitudinal length of the isolator to form the plurality of separate secondary flow channels;

a central pointed tip extending from the plurality of channel walls toward the first end of the isolator;

wherein the central pointed tip directs airflow from the air inlet to the plurality of separate secondary flow channels; and wherein the central pointed tip terminates upstream of the first end of the isolator housing.

2. The scramjet engine of claim 1, wherein each of the plurality of channel walls extend between a first edge wall and a second edge wall to define a sidewall thereof.

3. The scramjet engine of claim 2, wherein the first and second edge walls engage an inner perimeter wall of the isolator housing.

4. The scramjet engine of claim 2, wherein the sidewalls of the plurality of channel walls are curved in a lateral direction between first and second edge walls.

5. The scramjet engine of claim 4, wherein the channel walls and an inner perimeter wall of the isolator housing cooperate to form an elliptical cross sectional flow area through the plurality of separate secondary flow channels.

6. The scramjet engine of claim 1, wherein the central tip is terminates downstream of the first end of the isolator housing.

7. An isolator for a scramjet comprising:
a housing having a longitudinal length extending between a forward end and an aft end;
wherein the forward end receives airflow from an air inlet;
wherein the aft end discharges airflow to a combustor;
a plurality of separate flow channels formed internal to the housing configured to direct airflow therethrough;
wherein the plurality of separate flow channels are formed by solid walls that prevents fluid from passing therethrough;
a plurality of internal channel walls configured to form the plurality of separate flow channels within the housing; and
a pointed tip extending from the plurality of internal channel walls toward the forward end of the housing.

8. The isolator of claim 7, wherein the pointed tip projects past the forward end of the housing.

9. The isolator of claim 7, wherein each of the plurality of internal channel walls include a sidewall with an arcuate shape in a lateral direction between an opposing pair of edge walls.

10. The isolator of claim 9, wherein the opposing pair of edge walls of each internal channel wall engage with an internal wall of the housing.

11. The isolator of claim 10, wherein the internal wall of the housing is arcuate in cross section.

12. The isolator of claim 7, wherein a cross sectional shape of the plurality of separate flow channels are substantially elliptical.

13. A method for operating a scramjet comprising:
receiving airflow into an engine inlet at a speed of at least Mach 3;
compressing the airflow through the inlet;
splitting the airflow into a plurality of smaller flow paths in an isolator;
wherein the smaller flow paths extend to an aft end of the isolator;
discharging the airflow from the isolator into a combustor;
injecting fuel into the combustor;
combusting the fuel; and
accelerating an exhaust byproduct through a nozzle at supersonic speeds.

14. The method of claim 13 further comprising minimizing upstream shock wave propagation through the isolator using the plurality of smaller flow paths formed therein.

15. The method of claim 13 further comprising preventing upstream shock wave propagation through the isolator using the plurality of smaller flow paths formed therein.

* * * * *